US012771052B2

(12) United States Patent
Hsu et al.

(10) Patent No.: US 12,771,052 B2
(45) Date of Patent: Oct. 20, 2026

(54) ELECTRICAL CONNECTOR ASSEMBLY AND METHOD OF MAKING SAME

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Yang-Tsun Hsu, New Taipei (TW); Jun Chen, Kunshan (CN); Fan-Bo Meng, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 362 days.

(21) Appl. No.: 18/632,814

(22) Filed: Apr. 11, 2024

(65) Prior Publication Data

US 2024/0347938 A1 Oct. 17, 2024

(30) Foreign Application Priority Data

Apr. 11, 2023 (CN) ......................... 202310380506.9

(51) Int. Cl.
*H01R 12/70* (2011.01)
*H01R 12/71* (2011.01)
*H01R 13/6471* (2011.01)
*H01R 13/6594* (2011.01)

(52) U.S. Cl.
CPC ....... *H01R 12/7047* (2013.01); *H01R 12/716* (2013.01); *H01R 13/6471* (2013.01); *H01R 13/6594* (2013.01)

(58) Field of Classification Search
CPC .............. H01R 12/7047; H01R 12/716; H01R 13/6471; H01R 13/6592
USPC ........................................................... 439/78
See application file for complete search history.

(56) References Cited

U.S. PATENT DOCUMENTS

| | | | | |
|---|---|---|---|---|
| 4,925,400 A * | 5/1990 | Blair .................. | H01R 13/6485 | 29/842 |
| 5,310,352 A * | 5/1994 | Mroczkowski ........ | H01R 13/24 | 439/378 |
| 5,562,458 A * | 10/1996 | Stora ...................... | H01R 43/26 | 439/348 |

(Continued)

FOREIGN PATENT DOCUMENTS

| | | |
|---|---|---|
| CN | 203536587 U | 4/2014 |
| CN | 109411958 A | 3/2019 |

*Primary Examiner* — Harshad C Patel
(74) *Attorney, Agent, or Firm* — Ming Chieh Chang

(57) ABSTRACT

An electrical connector assembly for mounting to an external circuit board includes: a cable; a connector having a connection module electrically connected with the cable and the external circuit board, the connection module having an insulating body and plural conductive terminals disposed in the insulating body; a shielding case disposed outside the connector; and a fixing member for fastening the connector and the shielding case to the external circuit board, wherein the connector comprises an internal circuit board connecting to the cable and the connection module, and the shielding case forms a grounding connection with the internal circuit board through the fixing member.

19 Claims, 13 Drawing Sheets

(56) References Cited

U.S. PATENT DOCUMENTS

| | | | | | |
|---|---|---|---|---|---|
| 5,588,866 | A * | 12/1996 | Rothenberger | H01R 12/7082 439/372 |
| 6,425,768 | B1 * | 7/2002 | Taylor | H01R 12/79 439/67 |
| 6,530,801 | B2 * | 3/2003 | Bates | G02B 6/3878 439/364 |
| 6,896,535 | B2 * | 5/2005 | Yamada | H01R 12/88 439/289 |
| 7,980,881 | B2 * | 7/2011 | Furio | H01R 12/515 439/364 |
| 10,594,072 | B2 * | 3/2020 | Lim | H01R 13/6215 |
| 2020/0212633 | A1 * | 7/2020 | Masunaga | H01R 12/79 |
| 2022/0115816 | A1 * | 4/2022 | Huang | H01R 12/75 |
| 2023/0231344 | A1 * | 7/2023 | Zhao | H01R 13/6461 439/607.01 |
| 2023/0261399 | A1 * | 8/2023 | Blackburn | H01R 12/716 439/74 |

* cited by examiner

ELECTRICAL CONNECTOR ASSEMBLY AND METHOD OF MAKING SAME

BACKGROUND OF THE INVENTION

Field of the Invention

The present invention relates to an electrical connector assembly and a method of making same, and particularly to an electrical connector assembly with better grounding and shielding performance.

Description of Related Arts

China Patent Application Publication No. 109411958 discloses a connector module comprising a conductive shell with a main body, a terminal assembly fixed to the main body, and a cable connected with the terminal assembly. The terminal assembly includes an insulating body and several groups of signal terminals fixed in the insulating body. Each group of signal terminals includes a pair of signal terminals. Each of the signal terminals includes a terminal fixing portion fixed in the insulating body, a terminal wiring portion extending from the terminal fixing portion and connected to the cable, and a terminal mating portion extending from the terminal fixing portion for connecting to a circuit board. Adjacent two groups of signal terminals are shielded and isolated by the conductive shell. The cable and terminals of the connector module are directly welded one-to-one, which requires high precision and is difficult to manufacture. Therefore, an improved electrical connector assembly overcoming the deficiencies of the prior art while having good grounding and shielding performance is desired.

SUMMARY OF THE INVENTION

The main object of the present invention is to provide an improved electrical connector assembly with better grounding and shielding performance, wherein a cable and the conductive terminals do not need to be connected by one-to-one welding so that the number and arrangement of the conductive terminals can be flexible.

To achieve the above-mentioned object, an electrical connector assembly to be mounted to an external circuit board comprises: a cable; a connector comprising a connection module electrically connected with the cable and the external circuit board, the connection module comprising an insulating body and a plurality of conductive terminals disposed in the insulating body; a shielding case disposed outside the connector; and a fixing member for fastening the connector and the shielding case to the external circuit board, wherein the connector comprises an internal circuit board connecting to the cable and the connection module, and the shielding case forms a grounding connection with the internal circuit board through the fixing member.

A method of making an electrical connector assembly to be connected to an external circuit board comprises the steps of: connecting an internal circuit board to a cable and a connection module; installing a shielding case outside the connection module and the internal circuit board, the shielding case having a mounting hole; installing one end of a conductive mounting post in the mounting hole of the shielding case and connecting the other end of the conductive mounting post to the internal circuit board to establish an electrical connection between the shielding case and the internal circuit board; and installing a fastener from top to bottom through the conductive mounting post, the internal circuit board, and the connection module to connect to the external circuit board to press the conductive mounting post against the internal circuit board so as to transmit a force downward to the internal circuit board and the connection module through the mounting post to integrally fasten the electrical connector assembly to the external circuit board.

Compared to prior art, the electrical connector assembly in the present invention can provide better grounding and shielding performance and meet high-frequency characteristic requirements. By using an internal circuit board to electrically connect the cables and conductive terminals, the cable and the conductive terminal do not need to be connected by one-to-one welding, and the number and arrangement of the conductive terminals can also be more flexible.

DETAILED DESCRIPTION OF THE DRAWINGS

Figure 1:
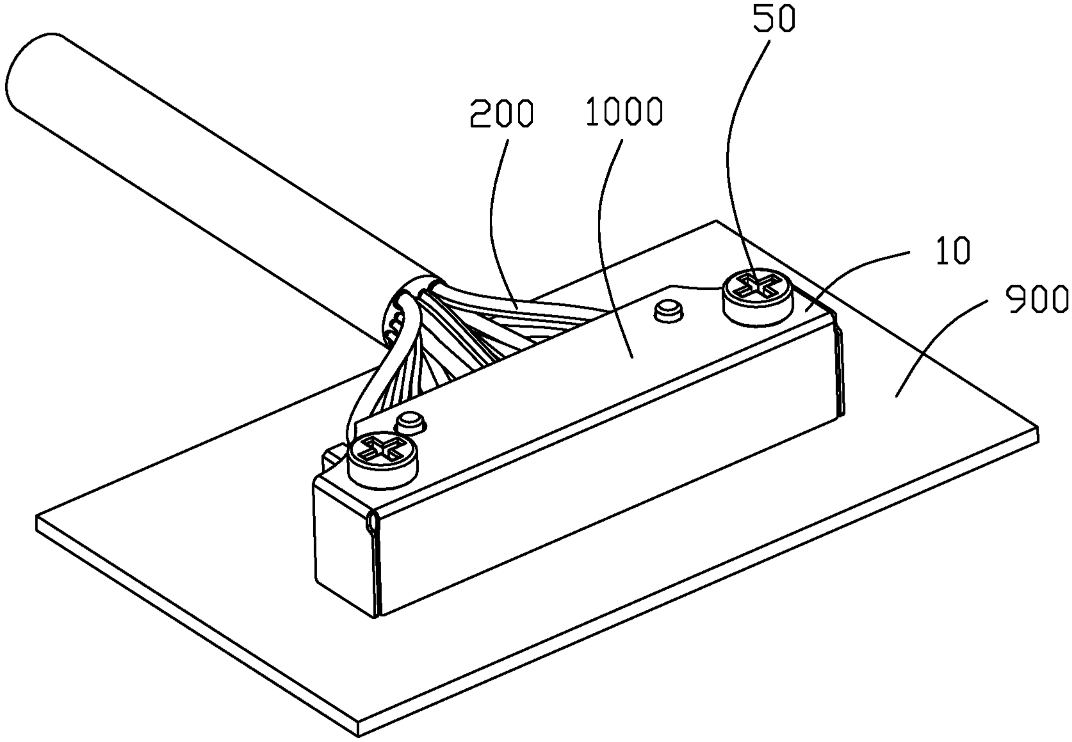
FIG. 1 is a perspective view of an electrical connector assembly mounted on an external circuit board.
Figure 2:
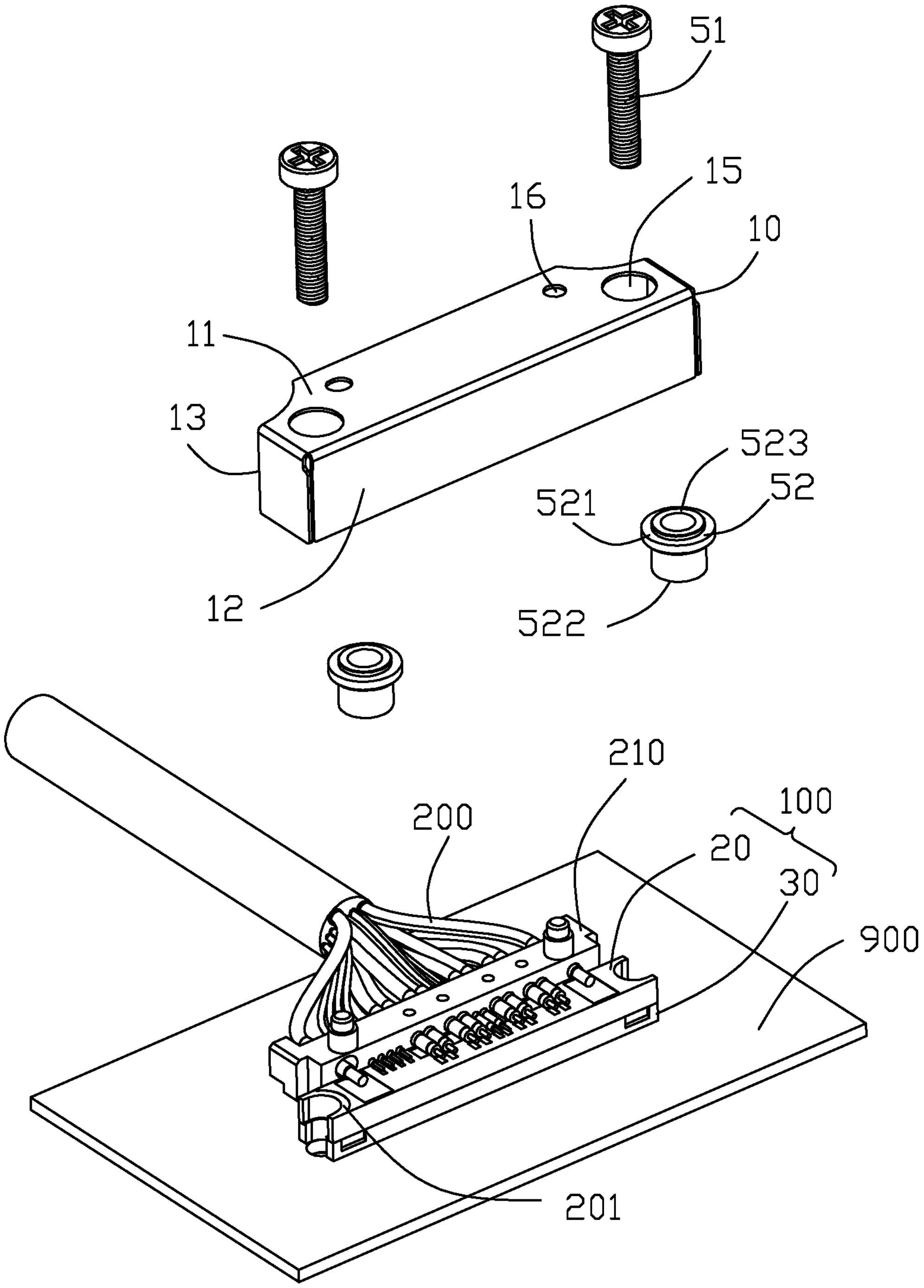
FIG. 2 is an exploded view of the electrical connector assembly shown in FIG. 1.
Figure 3:
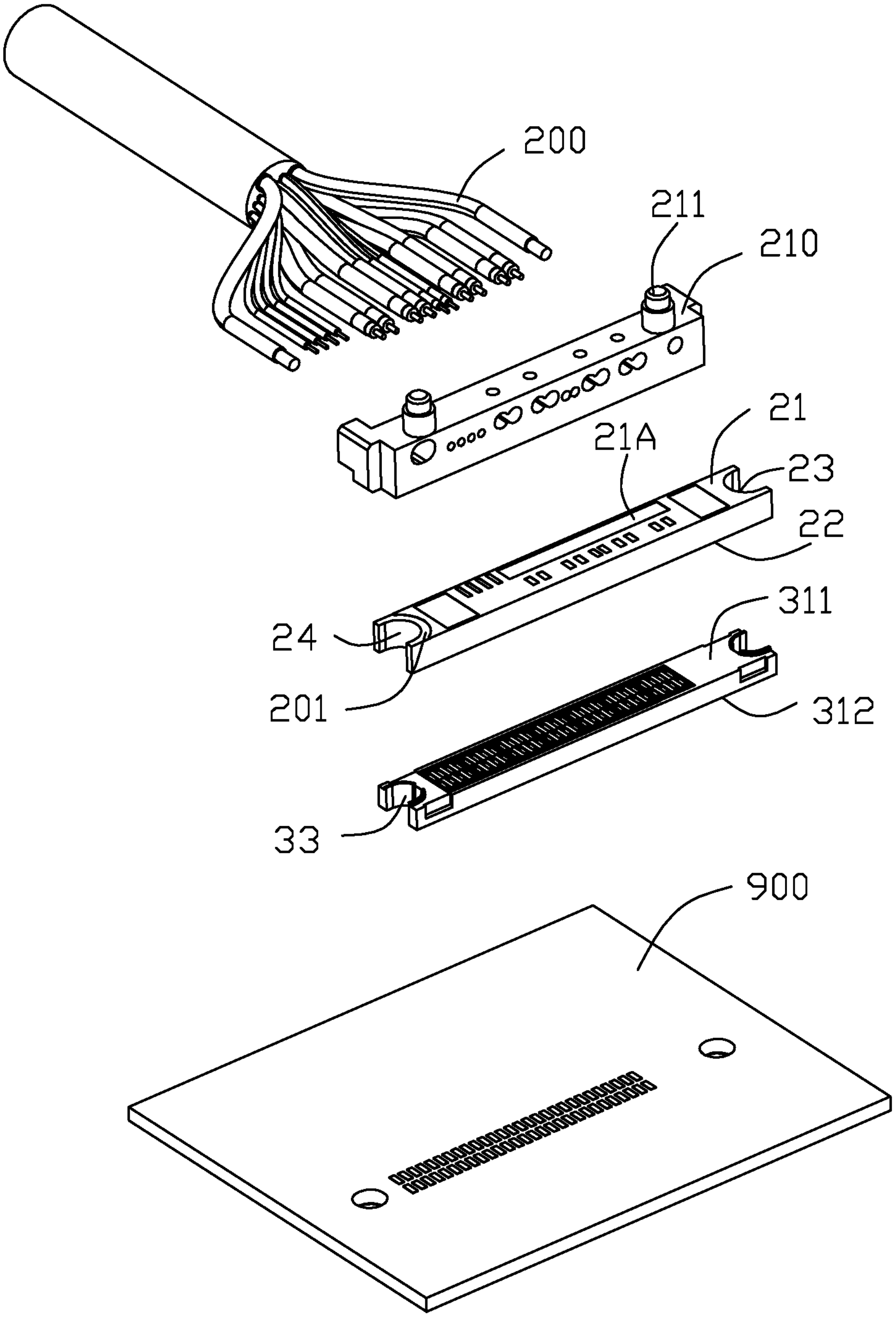
FIG. 3 is a further exploded view of the electrical connector assembly shown in FIG. 1, in which the shielding case and the fixing member are removed.
Figure 4:
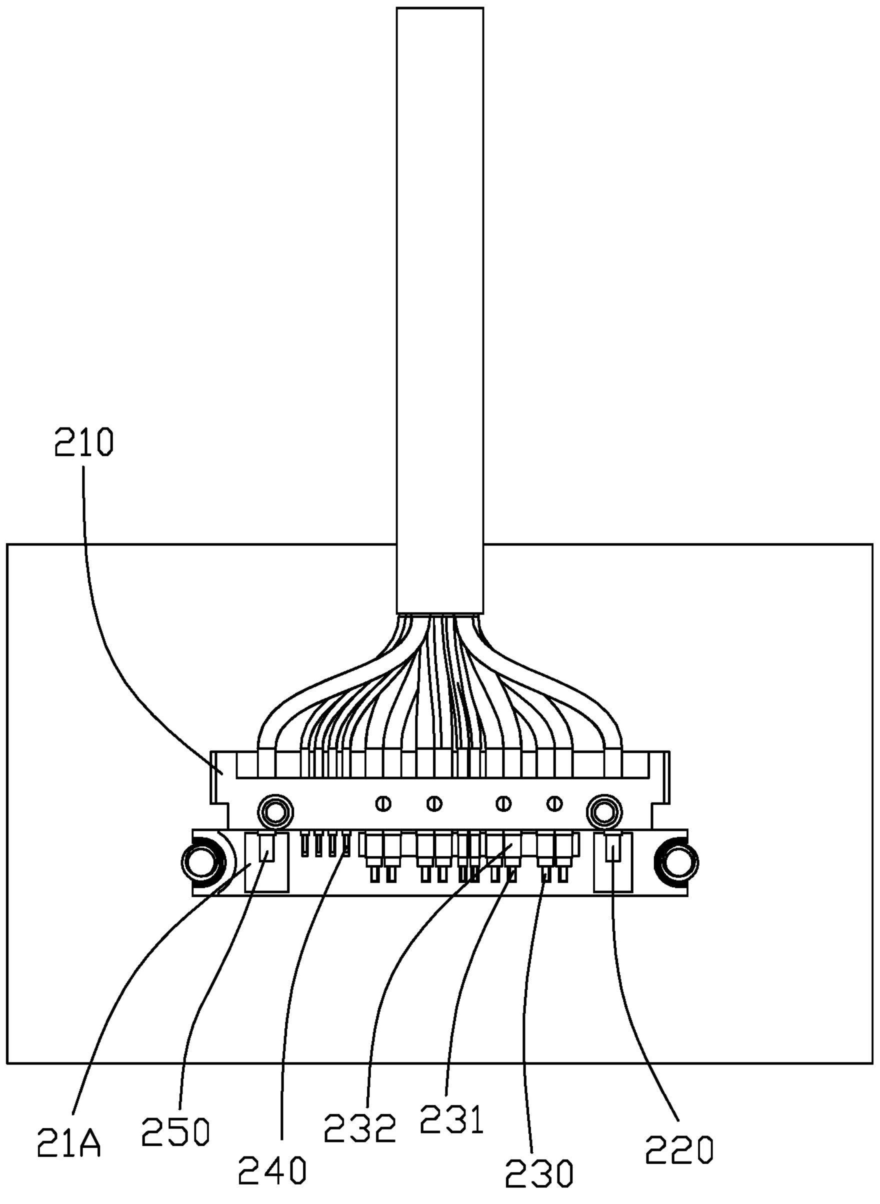
FIG. 4 is a top view of the connector assembly shown in FIG. 2, in which the shielding case and the fixing member are removed.
Figure 5:
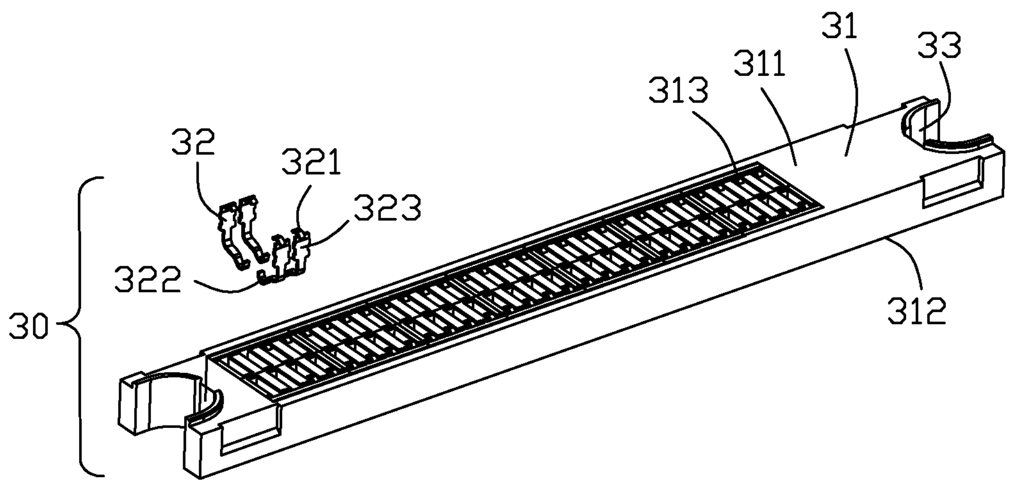
FIG. 5 is a perspective view of the connection module of the electrical connector assembly shown in FIG. 3, in which some of the conductive terminals are shown.

Referring to FIGS. 1-13, an electrical connector assembly 1000 of the present invention is to be connected to an external circuit board 900. The electrical connector assembly 1000 includes an electrical connector 100, a cable 200 connected with the connector, and a shielding case 10 covering the outside of the connector 100. The connector 100 includes an adapter module 20 electrically connected to the cable 200 and a connection module 30 electrically connected to the adapter module 20. The adapter module 20 is an internal circuit board. The connection module 30 includes an insulating body 31 and a plurality of conductive terminals 32 disposed in the insulating body 31, the conductive terminal 32 is directly connected to the external circuit board. The electrical connector assembly 1000 also includes a fixing member 50 which can fix the connector assembly 100 and the shielding housing 10 to the external circuit board 900, and the shielding case 10 is electrically connected to the internal circuit board 20 through the fixing member 50.

Referring to FIGS. 2-5, specifically, the internal circuit board 20 is provided between the cable 200 and the connection module 30. The internal circuit board 20 includes an upper surface 21 connected with the cable 200, a lower surface 22 connected with the connection module 30, and two side surface 23. A plurality of upper conductive sheets 21A are provided on the upper surface and are welded to the cable 200, and a plurality of lower conductive sheets 22A are provided on the lower surface and are welded to the conductive terminals 32. The insulating body 31 includes a top surface 311 in contact with the lower surface 22 of the internal circuit board 20, a bottom surface 312 in contact with the internal circuit board, and a plurality of terminal slots 313 penetrating from the top surface 311 to the bottom surface 312 for holding the conductive terminals. The conductive terminals 32 includes a first connecting portion 321 exposed from the top surface 311 of the terminal slot 313 and connected to the lower conductive sheet 22A, a second connecting portion 322 exposed from the bottom surface 312 of the terminal slot 313 and connected to the external circuit board, and an intermediate portion 323 held in the terminal slot 313 that connects the first connecting portion 321 and the second connecting portion 322. A plurality of the conductive terminals 32 are arranged in two aligned rows, front and rear. In this embodiment, twenty-eight conductive terminals are provided in each row. The shape and size of the internal circuit board 20 and the insulating body 31 in the length and width directions are substantially consistent, it makes the sides of the internal circuit board 20 and the insulating body 31 substantially aligned after the internal circuit board 20 and the conductive terminals 32 are connected.

The shielding case 10 includes an upper wall 11, a front wall 12 perpendicular to the upper wall 11 and away from the cable 200, and two side walls 13. Both ends of the upper wall 11 close to the side wall 13 are provided with mounting holes 15 that cooperate with the fixing member 50. The fixing member 50 includes a pair of fasteners 51 and a conductive mounting post 52 correspondingly matched with the fasteners 51. The conductive mounting post 52 is generally in the form of a hollow cylindrical structure. The conductive mounting post 52 includes an upper connecting portion 521 installed in the mounting hole, a lower connecting portion 522 directly contacts the internal circuit board 20, and a through hole 523 that passes through the fastener 51 in the up and down direction. The upper connecting part 521 is connected to the shielding shell by laser welding at the position of the mounting hole 15. The upper surface 21 of the internal circuit board 20 is provided with a grounding contact sheet 201 electrically connected to the lower connecting portion 522 at a position corresponding to the lower connecting portion 522 of one of the conductive mounting posts 52. In other embodiment, two ground sheets can also be provided on the upper surface 21 at positions corresponding to the lower connecting portions 522 of the two conductive mounting post 52 for contact connection therewith.

The internal circuit board 20 is provided with a first through hole 24 for the fastener 51 to pass through at a position corresponding to the mounting hole 15. The first through holes 24 are recessed inwardly from both side surfaces 23 of the internal circuit board 20. The connection module 30 is provided with a second through hole 33 at a position corresponding to the first through hole 24, the second through hole 33 is recessed inwardly from both sides of the insulating body 31. The first through hole 24 and the second through hole 33 are both unclosed arc shapes, and the first through hole 24 is slightly larger than the second through hole 33. The fastener 51 extends from top to bottom through the mounting hole 15, the through hole 523 and continues downward through the first through hole 24, the second through hole 33 and the mating mounting holes of the external circuit board to lock and fix the electrical connector 100, the shielding shell 10 and the external circuit board 900. The cooperation of the conductive mounting posts 52 and the fasteners 51 can not only make the electrical connection between the shielding case 10 and the internal circuit board 20 to form a good grounding performance, but also make the connection between the cable 200 and the internal circuit board 20, the connection between the internal circuit board 20 and the connection module 30, and the connection between the connection module 30 and the external circuit board 9010 more stable. The overall structure of the electrical connector 100 is more stable, and the connection with the external circuit board is also more stable.

The cable 200 is also provided with a cable holder 210 near the connection position with the internal circuit board 20. Two limiting posts 211 are provided at both ends of the cable holder 210 parallel to the arrangement direction of the cables 200. The upper wall 11 of the shielding case 10 is provided with a limiting hole 16 matching the limiting post 211 at a position corresponding to the limiting post 211. The cable 200 includes a row of multiple wires arranged in parallel. The multiple wires include a power wire 220, five pairs of high-frequency signal wires 230 for transmitting differential signals, four low-frequency signal wires 240 for transmitting low frequency signal, and a ground wire 250 arranged in sequence. The high-frequency signal wire 230 includes a high-frequency signal conductor 231 and an external metal braid layer 232.

Referring to FIGS. 6-13, the internal circuit board 20 includes an upper layer 25 with upper conductive lines 251, a lower layer 26 with lower conductive lines 261, and a ground layer 27 disposed between the upper layer 25 and the lower layer 26. The ground layer includes a first ground layer 271, a second ground layer 272, a third ground layer 273 and a fourth ground layer 274 that are continuously arranged between the upper layer 25 and the lower layer 26 from top to bottom. The upper layer 25, the lower layer 26 and each of the ground layers 27 are electrically connected through a plurality of conductive holes 28 to form up and down conduction. The upper conductive lines 251 include a plurality of first upper signal line pairs 2511 for transmitting high-frequency signals, a first upper ground line 2512 surrounding the first upper signal line pair 2511 and separating adjacent first upper signal line pairs 2511, a second upper ground line 2513 connected to the first upper ground line 2512 and extending along the arrangement direction of the first upper signal line pair 2511, a plurality of second upper signal lines 2514 for transmitting low-frequency signals, an upper power line 2515 for transmitting power, and a third upper ground line 2516. The lower conductive lines 261 include a plurality of first lower signal line pairs 2611 for transmitting high-frequency signals, a plurality of second lower signal line pairs 2613 for transmitting low-frequency signals, a lower ground line 2612 and a lower power line 2614.

The plurality of conductive holes 28 include a plurality of first conductive holes 281, second conductive holes 282, third conductive holes 283, fourth conductive holes 284 and fifth conductive holes 285. The plurality of first conductive holes 281 are electrically connected up and down, so that the first upper ground line 2512, the second upper ground line 2513, the lower ground line 2612 and the second to fifth ground layers are electrically connected up and down, such a design can form a three-dimensional grille surrounding the first upper signal line pair 2511 and the first lower signal line pair 2611 to effectively isolate noise. The plurality of second conductive holes 282 electrically connect the first upper signal line pairs 2511 and the first lower signal line pairs 2611. The plurality of third conductive holes 283 electrically connect the second upper signal line 2514 and the second lower signal line 2613. The plurality of fourth conductive holes 284 electrically connect the upper power line 2515 and the lower power line 284. The plurality of fifth conductive holes 285 are electrically connected up and down to connect the third upper ground line 2516, the lower ground line 2612, the first ground layer 271, the second ground layer 272, the third ground layer 273, and the fourth ground layer 274. The first ground layer 271, the second ground layer 272, the third ground layer 273 and the fourth ground layer 274 are all provided digging holes 29 at positions corresponding to the second conductive holes 282, the third conductive holes 283 and the fourth conductive holes 284. The second conductive hole 282, the third conductive hole 283 and the fourth conductive hole 284 pass through the digging hole 29 but are not connected to the corresponding first ground layer 271, second ground layer 272 and third ground layer 273 and the fourth ground layer 274. The first conductive hole 281, the second conductive hole 282, the third conductive hole 283, the fourth conductive hole 284 and the fifth conductive hole 285 are aligned up and down, and their projections in the thickness direction of the internal circuit board 20 overlap.

Figure 6:
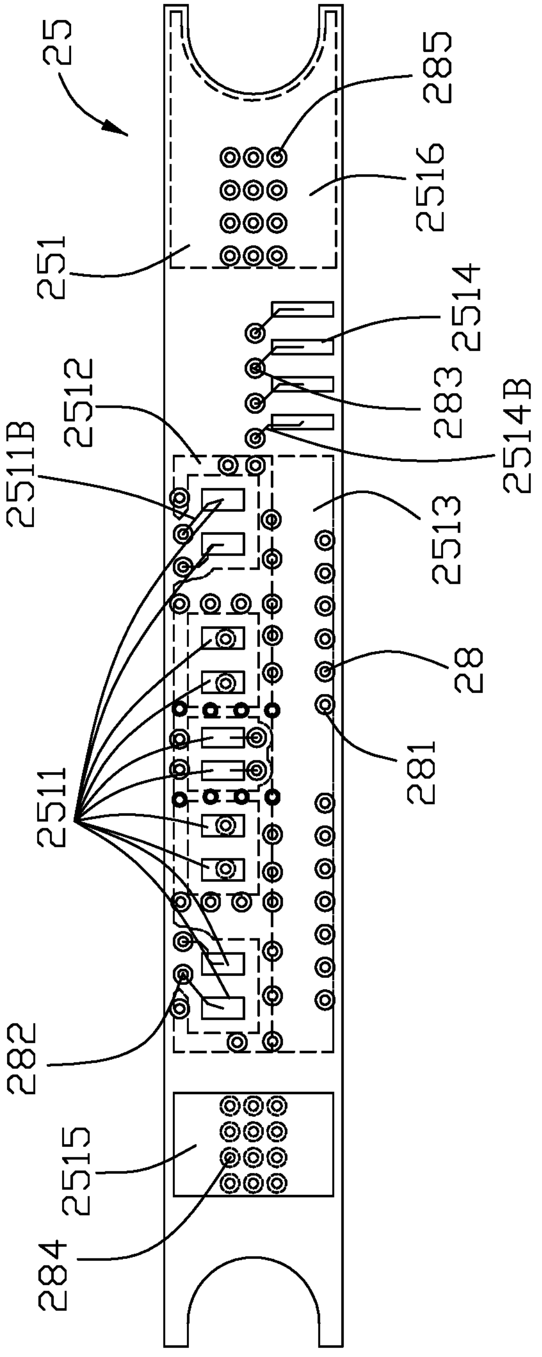
FIG. 6 is a schematic diagram of the upper layer of the internal circuit board shown in FIG. 3, in which the upper conductive line can be seen.
Figure 7:
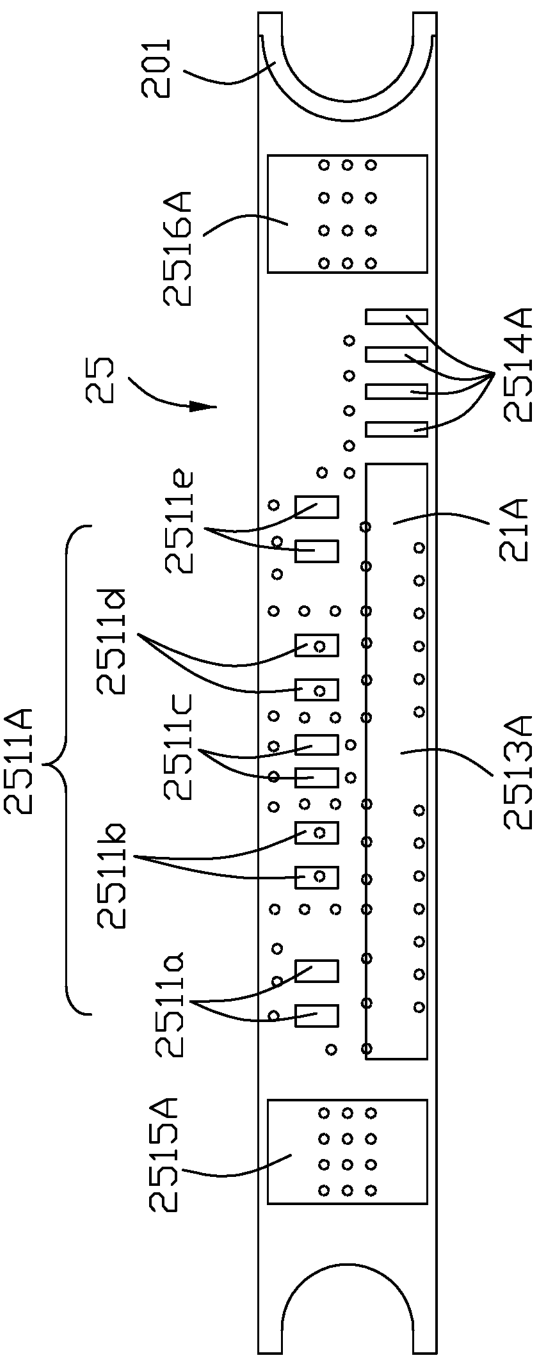
FIG. 7 is a schematic diagram of the upper layer of the internal circuit board shown in FIG. 3, in which multiple upper conductive sheets and contact ground sheets can be seen.
Figure 8:
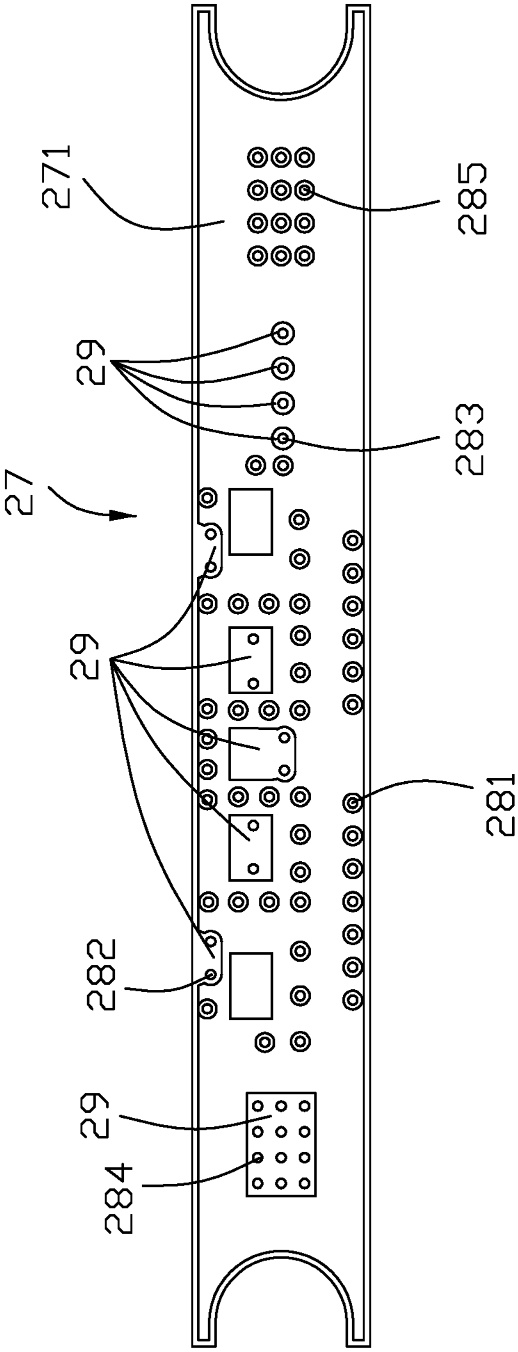
FIG. 8 is a schematic diagram of the first ground layer of the internal circuit board shown in FIG. 3.
Figure 9:
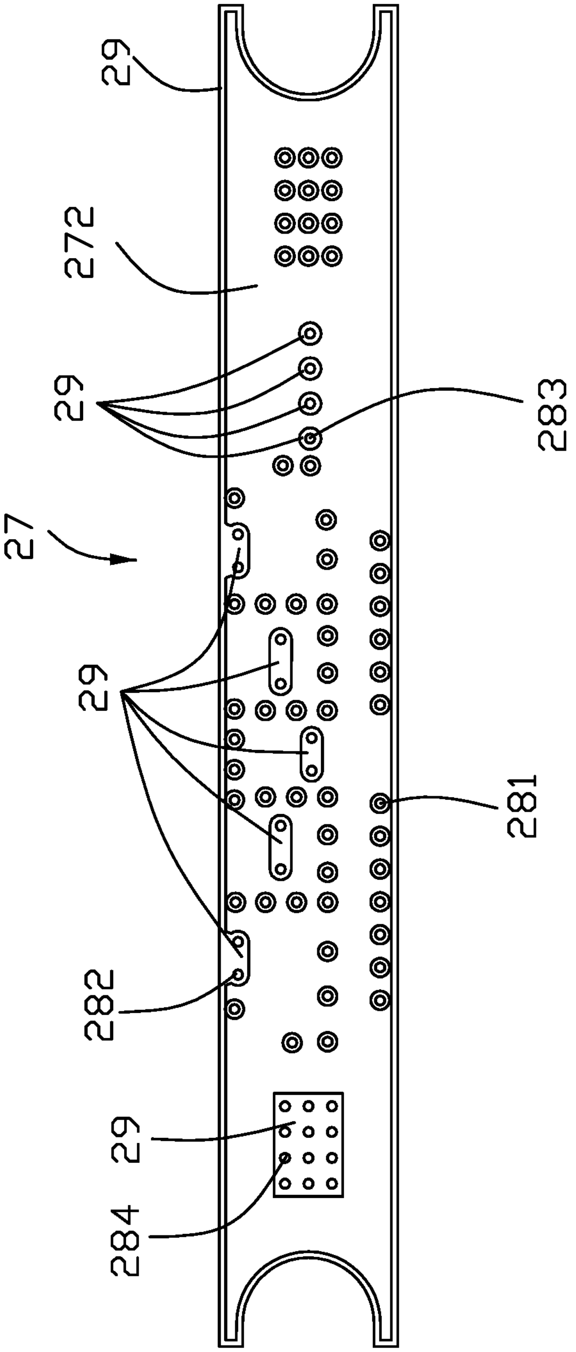
FIG. 9 is a schematic diagram of the second ground layer of the internal circuit board shown in FIG. 3.
Figure 10:
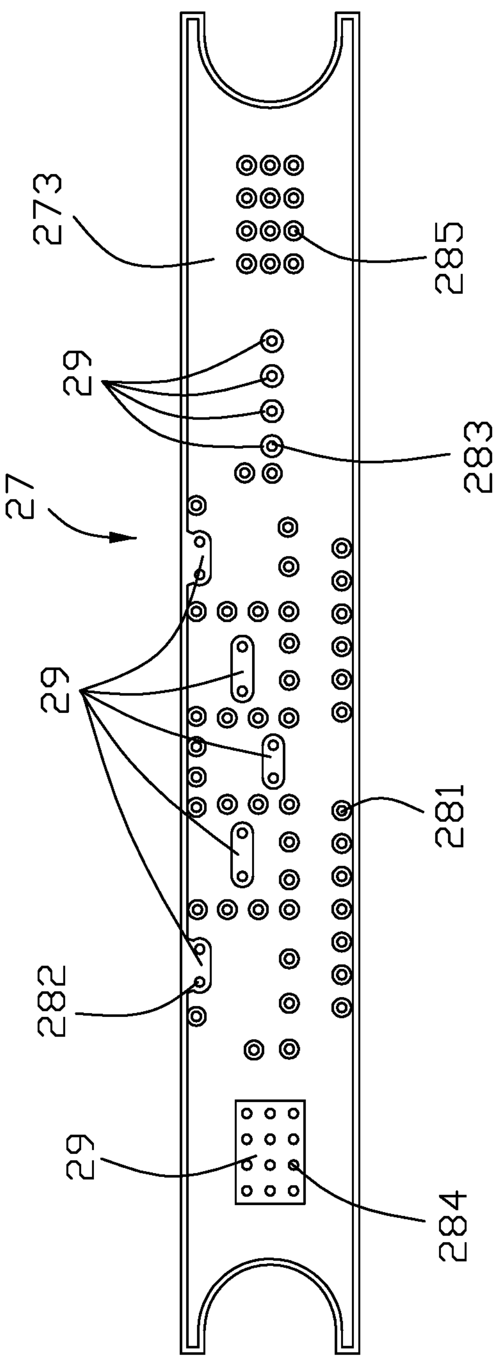
FIG. 10 is a schematic diagram of the third ground layer of the internal circuit board shown in FIG. 3.
Figure 11:
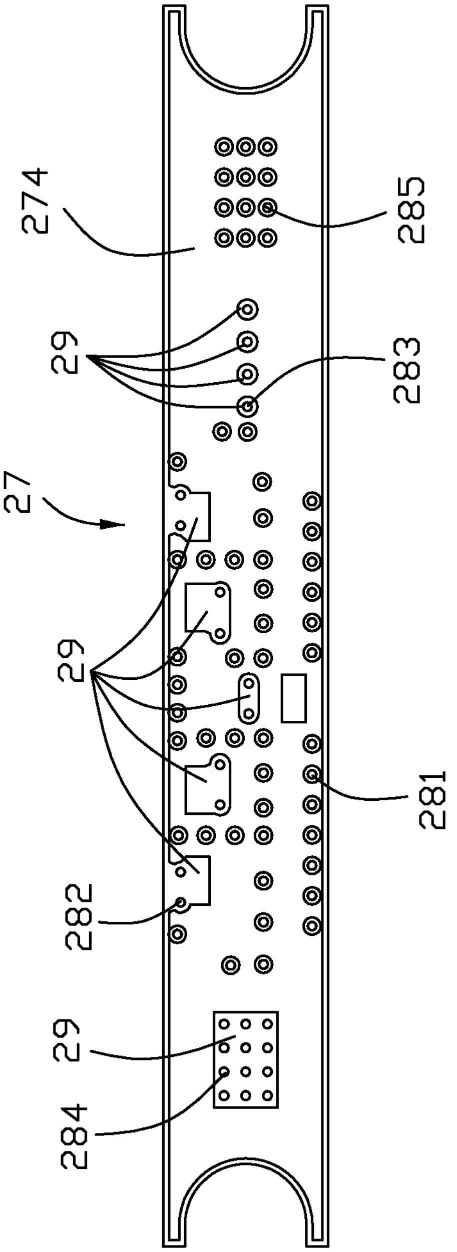
FIG. 11 is a schematic diagram of the fourth ground layer of the internal circuit board shown in FIG. 3.

Referring to FIGS. 6-7, multiple pairs of first upper signal conductive sheets 2511A are provided on the plurality of first upper signal line pairs 2511. The first upper signal conductive sheet 2511A includes a first to fifth upper signal conductive sheet pair 2511*a*, 2511*b*, 2511*c*, 2511*d*, 2511*e* arranged sequentially along the arrangement direction of the cable 200. The first, third, and fifth upper signal conductive sheet pairs are electrically connected to the corresponding second conductive holes 282 through the corresponding first upper conductive traces 2511B. A second conductive hole 282 is directly provided at the position of the second and fourth upper signal conductive sheet pairs. The second upper ground line 2513 is provided with a second upper ground sheet 2513A spaced apart from a plurality of pairs of the first upper signal conductive sheets 2511A in the front and rear directions, and the length of the second upper ground sheet 2513A extends along the arrangement direction of the pairs of first upper signal conductive sheets 2511A. When the first to fifth upper signal conductive sheet pairs 2511*a*, 2511*b*, 2511*c*, 2511*d*, 2511*e* are welded and connected to the corresponding high-frequency signal conductor 231 of the high-frequency signal wire 230, the second upper ground sheet 2513A is welded to the metal braid layer 232 of the high-frequency signal wire 230. In this way, the first upper ground line and the second upper ground line are electrically connected and form an annular ground around each of the first upper signal line pairs, which is beneficial to reducing crosstalk interference in signal transmission and effectively isolating noise. Moreover, there is no need to provide a grounding sheet between each pair of first upper signal conductive sheets, and the spacing between each pair of first upper signal conductive sheets is reduced, thereby shortening the overall length and reducing space. The plurality of second upper signal lines 2514 are provided with four second upper signal conductive sheets 2514A on one side of the second upper ground sheet 2513A. The second upper signal conductive sheet 2514A is electrically connected to the corresponding third conductive hole 283 through the corresponding second upper conductive trace 2514B, and the second upper signal conductive sheet 2514A is welded and connected to the low-frequency signal wire 240. The upper power line 2515 includes an upper power conductive sheet 2515A provided on the other side of the second upper ground sheet 2513A, and the upper power conductive sheet 2515A is welded and connected to the power wire 220. The third upper ground line 2516 is provided with a third upper ground sheet 2516A on the other side opposite to the upper power conductive sheet 2515A and a grounding contact sheet 201 electrically connected to the shielding case 10. The third upper ground sheet 2516A is welded to the ground wire 250, and the grounding contact sheet 201 is directly connected to the lower connecting portion 522 of the conductive mounting post 52 to form an electrical connection.

Figure 12:
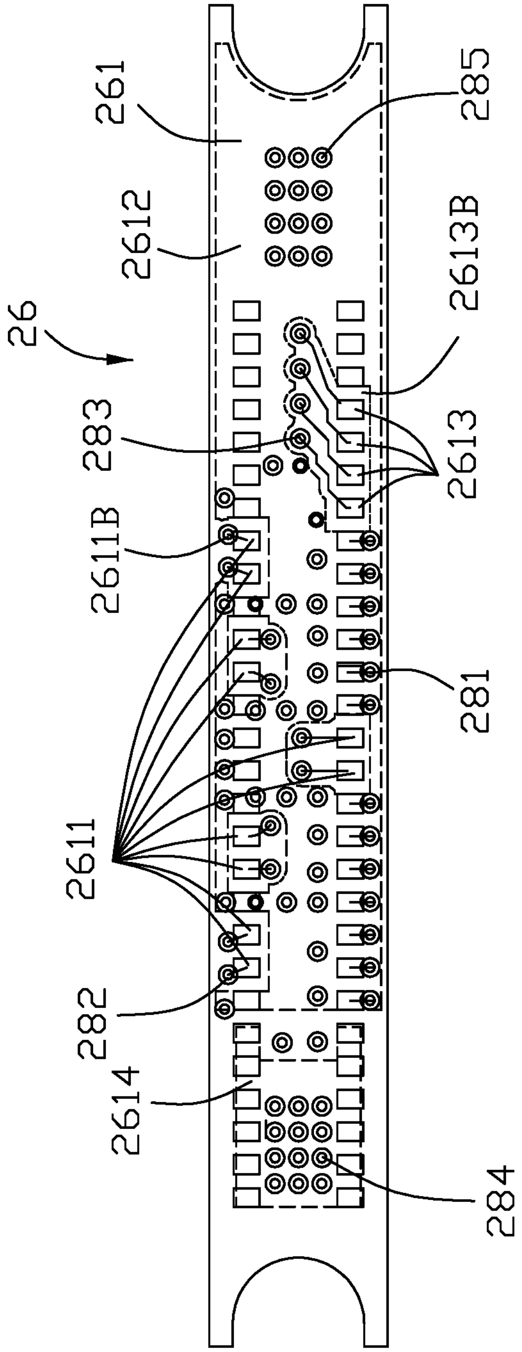
FIG. 12 is a schematic diagram of the lower layer of the internal circuit board shown in FIG. 3, in which the lower conductive line can be seen.
Figure 13:
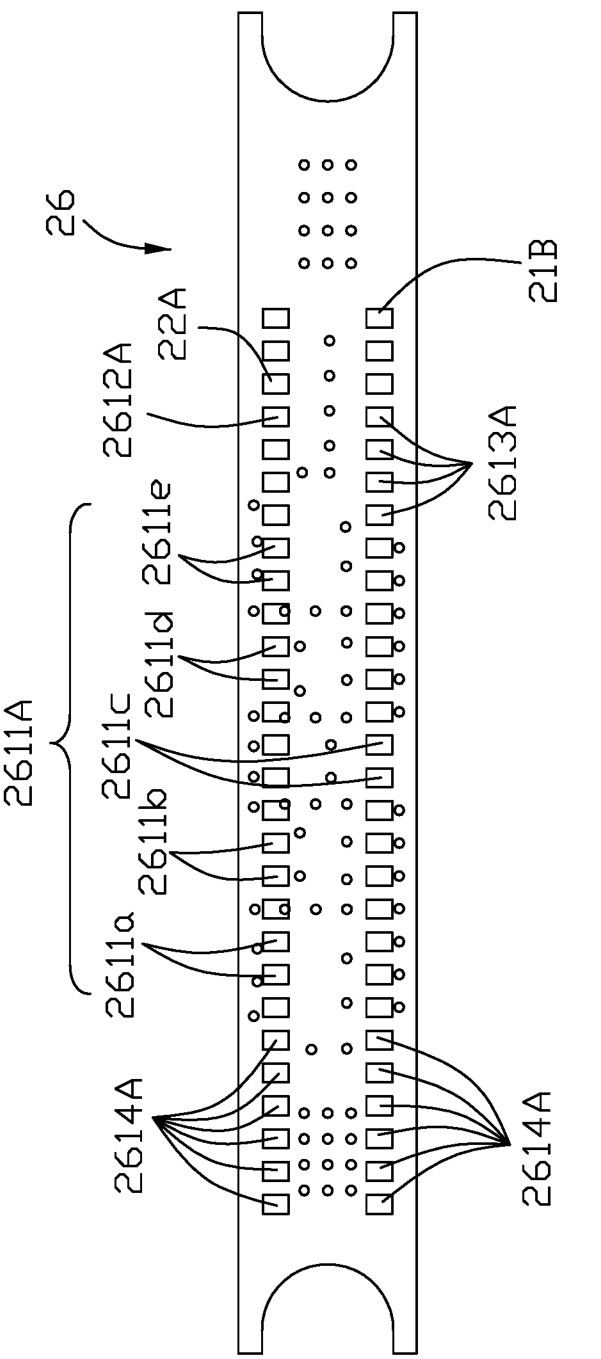
FIG. 13 is a schematic diagram of the lower layer of the internal circuit board shown in FIG. 3, in which multiple lower conductive sheets can be seen.

Referring to FIGS. 12-13, multiple pairs of first lower signal conductive sheets 2611A are provided on the plurality of first lower signal line pairs 2611. The first lower signal conductive sheet 2611A includes first to fifth lower signal conductive sheet pairs 2611*a*, 2611*b*, 2611*c*, 2611*d*, 2611*e*. The first to fifth pairs of lower signal conductive sheets 2611*a*, 2611*b*, 2611*c*, 2611*d*, and 2611*e* are electrically connected to the corresponding second conductive holes 282 through the corresponding first lower signal traces 2611B. Four second lower signal conductive sheets 2613A are provided on the lower signal lines 2613. The second lower signal conductive sheet 2613A is electrically connected to the third conductive hole 283 through the corresponding second lower conductive trace 2613B. The lower ground line 2612 is provided with a plurality of lower ground sheets 2612A, and the lower power line 2614 is provided with a plurality of lower power conductive sheets 2614A. All the first lower signal conductive sheet 2611A, the second lower signal conductive sheet 2613A, the lower ground sheet 2612A, and the lower power conductive sheet 2614A are aligned in two rows, with the number of each row being twenty-eight. Specifically, the first to sixth in the first row are the lower power supply conductive sheets 2614A, the eighth and ninth of the first row are the first lower signal conductive sheet pair 2611*a* which are electrically connected with the first upper signal conductive sheet pair 2511*a*, the eleventh and twelfth of the first row are the second lower signal conductive sheet pair 2611*b* which are electrically connected with the second upper signal conductive sheet pair 2511*b*, the seventeenth and eighteenth of the first row are the fourth lower signal conductive sheet pair 2611*d* which are electrically connected with the fourth upper signal conductive sheet pair 2511*d*, the twentieth and twenty-first in the first row are the fifth lower signal conductive sheet pair 2611*e* which are electrically connected to the fifth upper signal conductive sheet pair 2511*e*, and the rest of the first row are all lower ground sheets 2612A. The first to sixth of the second row are the lower power conductive sheets 2614A, the fourteenth and fifteenth of the second row are the third lower signal conductive sheet pair 2611*c* which are electrically connected with the third upper signal conductive sheet pair 2511*c*, the twenty-two, twenty-three, twenty-four, and twenty-five of the second row are second lower signal conductive sheets 2613A which are electrically connected to the corresponding four second upper signal conductive sheets 2514A, and the rest of the second row are all lower ground plates 2612A. The first lower signal conductive sheet 2611A, the second lower signal conductive sheet 2613A, the lower ground sheet 2612A, and the lower power conductive sheet 2614A are welded and connected to the corresponding first connection portion 321 of the conductive terminal 32.

The grounding contact sheet 201 is in direct contact with the conductive mounting post 52, and the remaining upper and lower conductive sheets need to be coated with solder paste to be soldered and connected to the corresponding cables and conductive terminals respectively. In addition, the positions on the first ground layer 271 corresponding to the second conductive hole 282 are hollowed out, and the positions on the first ground layer 271 corresponding to the first to fifth upper signal conductive sheet pairs 2511*a*, 2511*b*, 2511*c*, 2511*d*, and 2511*e* are also hollowed out. Similarly, the positions of the fourth ground layer 274 corresponding to the first to fifth lower signal conductive sheet pairs 2611*a*, 2611*b*, 2611*c*, 2611*d*, and 2611*e* are also hollowed out. The purpose of this design is to adjust the impedance matching to ensure stable signal transmission.

A method of making the electrical connector assembly 1000 is as follows, providing a cable 200; providing a connection module 30; providing an internal circuit board 20 and connecting the internal circuit board 20 to the cable 200 and the connection module 30; installing a shielding case 10 outside the connection module 30 and the internal circuit board 20, and disposing a mounting hole 15 on the shielding case 10; providing a fastener 51 and a conductive mounting post 52 through which the fastener can pass, installing one end of the conductive mounting post in the mounting hole of the shielding case, and connecting the other end of the conductive mounting post to the internal circuit board 20, to realize the electrical connection between the shielding case 10 and the internal circuit board 20; installing the fastener 51 from top to bottom through the conductive mounting post 52, the internal circuit board 20 and the connection module to connect to the external circuit board 900 and applying downward pressure at the same time, forcing the conductive mounting post 52 downward to be tightly connected to the internal circuit board, and continuously transmitting the force downward to the internal circuit board and the connection module through the mounting post to integrally fastening the electrical connector assembly to the external circuit board.

The electrical connector assembly 1000 in the present invention can provide better grounding and shielding performance and meet high-frequency characteristic requirements by electrically connecting the shielding shell with the internal circuit board. By using an internal circuit board to electrically connect the cables and conductive terminals, the cable and the conductive terminal do not need to be connected by one-to-one welding, and the number and arrangement of the conductive terminals can also be more flexible.

The invention claimed is:

1. An electrical connector assembly to be mounted to an external circuit board, comprising:

- a cable;
- a connector comprising a connection module electrically connected with the cable and the external circuit board, the connection module comprising an insulating body and a plurality of conductive terminals disposed in the insulating body;
- a shielding case disposed outside the connector; and
- a fixing member for fastening the connector and the shielding case to the external circuit board; wherein the connector comprises an internal circuit board connecting to the cable and the connection module, and the shielding case forms a grounding connection with the internal circuit board through the fixing member.

2. The electrical connector assembly as claimed in claim 1, wherein the shielding case includes an upper wall, a front wall perpendicular to the upper wall and away from the cable, and two side walls disposed on both sides of the front wall, and the upper wall is provided with a mounting hole matching the fixing member.

3. The electrical connector assembly as claimed in claim 2, wherein the fixing member includes a fastener and a conductive mounting post matching with the fastener, the conductive mounting post further includes an upper connecting portion installed in the mounting hole, a lower connecting portion directly in contact with the inner circuit board, and a through hole penetrating in the up and down direction for the fastener to pass through.

4. The electrical connector assembly as claimed in claim 3, wherein the upper connecting portion is laser welded to the upper wall at the mounting hole.

5. The electrical connector assembly as claimed in claim 4, wherein the internal circuit board includes an upper surface connected to the cable and a lower surface connected to the connection module.

6. The electrical connector assembly as claimed in claim 5, wherein the upper surface of the internal circuit board is provided with a grounding contact sheet connected to the lower connecting portion of the conductive mounting post.

7. The electrical connector assembly as claimed in claim 6, wherein:

- the internal circuit board includes an upper layer with upper conductive lines connected to the cable, a lower layer with lower conductive lines connected to the connection module, and a ground layer provided between the upper layer and the lower layer;
- the upper layer, the lower layer, and the ground layer are electrically connected through a plurality of conductive holes to form an electrical conduction;
- the upper conductive lines include a plurality of upper signal line pairs and an upper ground line, the lower conductive lines include a plurality of lower signal line pairs and a lower ground line;
- the upper ground line include a first upper ground line surrounding each upper signal line pair, a second upper ground line connected to the first upper ground line and arranged along the arrangement direction of the plurality of upper signal line pairs; and
- the upper ground line, the lower ground line, and the ground layer are electrically connected through the conductive holes to form a three-dimensional grid surrounding each upper signal line pair and each lower signal line pair.

8. The electrical connector assembly as claimed in claim 7, wherein the cable includes a signal wire having a signal conductor electrically connected to the corresponding upper signal line pair and a metal braid layer arranged outside the signal conductor, and the metal braid layer is electrically connected to the second upper ground line.

9. The electrical connector assembly as claimed in claim 7, wherein the upper ground line includes a third upper ground line connected to the ground layer and the lower ground line, and the grounding contact sheet is provided on the third upper ground line.

10. The electrical connector assembly as claimed in claim 7, wherein the ground layer includes a first ground layer, a second ground layer, a third ground layer, and a fourth ground layer arranged in sequence between the upper layer and the lower layer from top to bottom.

11. The electrical connector assembly as claimed in claim 7, wherein the conductive hole connecting the upper and lower signal line pairs passes through the ground layer and is spaced away the ground layer.

12. The electrical connector assembly as claimed in claim 6, wherein only one grounding contact sheet is provided.

13. The electrical connector assembly as claimed in claim 5, wherein the insulating body includes a top surface in contact with the lower surface of the internal circuit board, a bottom surface in contact with the external circuit board, and a terminal slot penetrating from the top surface to the bottom surface for retaining the conductive terminals.

14. The electrical connector assembly as claimed in claim 13, wherein the conductive terminal includes a first connection portion exposed to the top surface at the terminal slot and connected to the lower surface of the internal circuit board, a second connecting portion exposed to the bottom surface at the terminal slot and elastically abutting the external circuit board, and an intermediate portion connected between the first connecting portion and the second connecting portion and held in the terminal slot.

15. The electrical connector assembly as claimed in claim 1, wherein the shape and size of the internal circuit board and the insulating body are consistent in both length and width directions so that the sides of the internal circuit board and the insulating body are aligned after being connected.

16. The electrical connector assembly as claimed in claim 3, wherein the internal circuit board is provided with a first through hole for the fastener to pass through at a position corresponding to the mounting hole, the connection module is provided with a second through hole at a position corresponding to the first through hole, and the fastener penetrates the through hole from top to bottom and extends downward through the first through hole and the second through hole to securely connect the electrical connector assembly to the external circuit board.

17. The electrical connector assembly as claimed in claim 16, wherein both the first through hole and the second through hole are unclosed arc shapes.

18. The electrical connector assembly as claimed in claim 2, further comprising a cable holder having a limiting column, and wherein the upper wall is provided with a corresponding limiting hole matching the limiting column.

19. A method of making an electrical connector assembly to be connected to an external circuit board, comprising the steps of:

connecting an internal circuit board to a cable and a connection module;

installing a shielding case outside the connection module and the internal circuit board, the shielding case having a mounting hole;

installing one end of a conductive mounting post in the mounting hole of the shielding case and connecting the other end of the conductive mounting post to the internal circuit board to establish an electrical connection between the shielding case and the internal circuit board; and installing a fastener from top to bottom through the conductive mounting post, the internal circuit board, and the connection module to connect to the external circuit board to press the conductive mounting post against the internal circuit board so as to transmit a force downward to the internal circuit board and the connection module through the mounting post to integrally fasten the electrical connector assembly to the external circuit board.

* * * * *